United States Patent [19]

Sato et al.

[11] Patent Number: 5,032,909
[45] Date of Patent: Jul. 16, 1991

[54] IMAGE ENHANCER WHICH UTILIZES A LOWPASS FILTER AFTER AN OUTLINE EXTRACTING CIRCUIT

[75] Inventors: Mitsuru Sato; Toshiaki Isogawa; Toshizumi Ando; Shingo Nakata, all of Kanagawa, Japan

[73] Assignee: Sony Corporation, Tokyo, Japan

[21] Appl. No.: 366,616

[22] Filed: Jun. 15, 1989

[30] Foreign Application Priority Data

Jun. 20, 1988 [JP] Japan ................ 63-081322[U]

[51] Int. Cl.⁵ ..................... H04N 5/208; H04N 5/21
[52] U.S. Cl. ........................... 358/162; 358/166
[58] Field of Search ............... 358/162, 166, 167, 36, 358/37

[56] References Cited

U.S. PATENT DOCUMENTS

| | | | |
|---|---|---|---|
| 3,946,153 | 3/1976 | Peth et al. | 358/162 |
| 3,995,108 | 11/1976 | Morrison | 358/162 |
| 4,015,076 | 3/1977 | Ishiodori | 358/167 |
| 4,360,830 | 11/1982 | Poetsch et al. | 358/166 X |
| 4,541,014 | 9/1985 | Yagi | 358/166 |
| 4,912,551 | 3/1990 | Ozaki | 358/162 X |
| 4,916,542 | 4/1990 | Yoneda et al. | 358/167 |
| 4,931,743 | 6/1990 | Fukuda et al. | 358/167 X |

FOREIGN PATENT DOCUMENTS 63-142777 6/1988 Japan.
63-316571 12/1988 Japan.
1-132278 5/1989 Japan.

*Primary Examiner*—James J. Groody
*Assistant Examiner*—Mark R. Powell
*Attorney, Agent, or Firm*—Hill, Van Santen, Steadman & Simpson

[57] ABSTRACT

According to the present invention, in an image enhancer, an output of an outline extracting circuit is transmitted through a band limiting filter for suppressing bands other than an objective frequency band to be enhanced and, thereafter, it is supplied to a noise slicing circuit for eliminating micro amplitude noises. The noises near the cut-off frequency of the filter can be more effectively suppressed and the deterioration of the waveform characteristic of the outline enhancement signal due to the filter can be also improved.

1 Claim, 4 Drawing Sheets

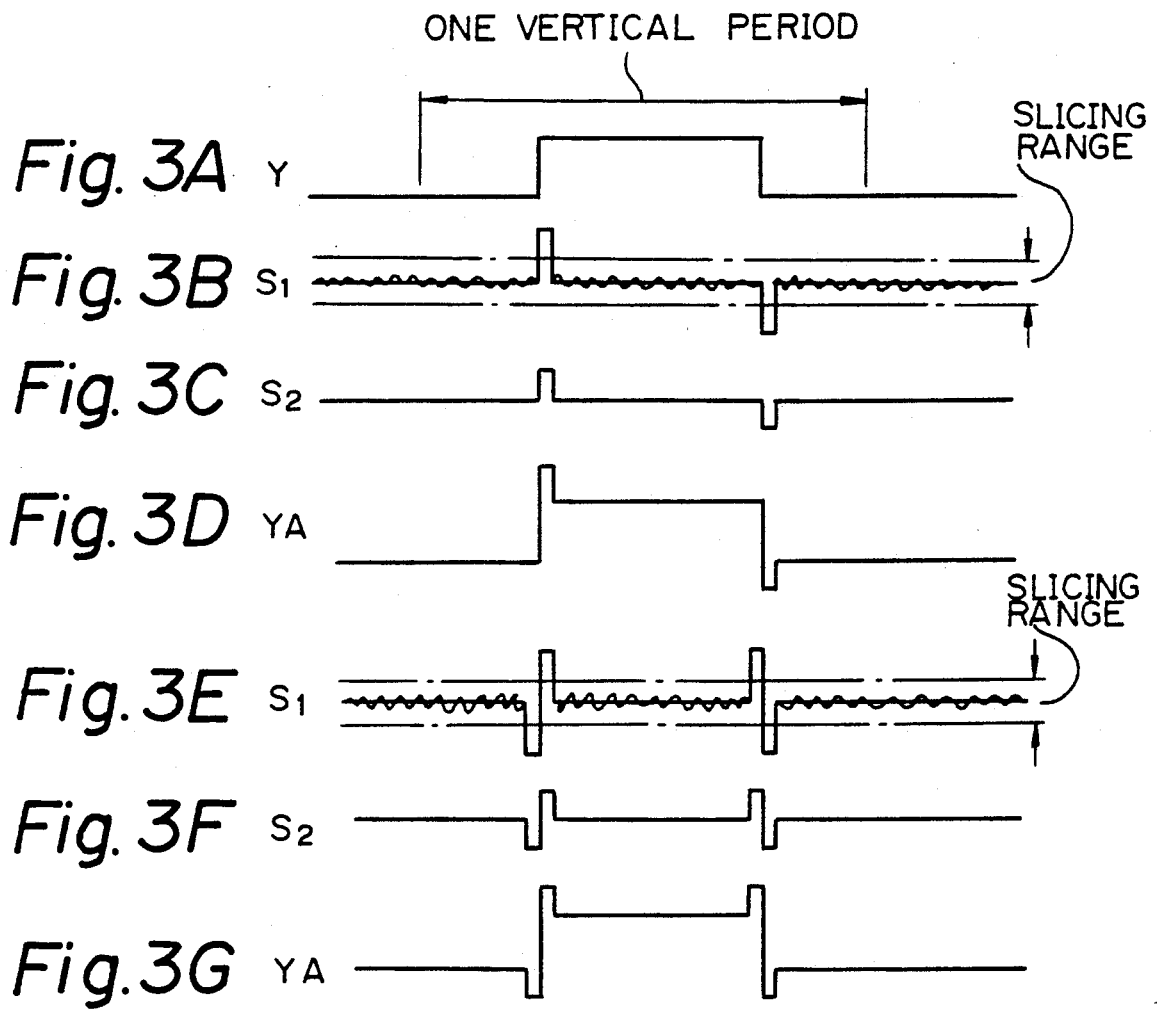
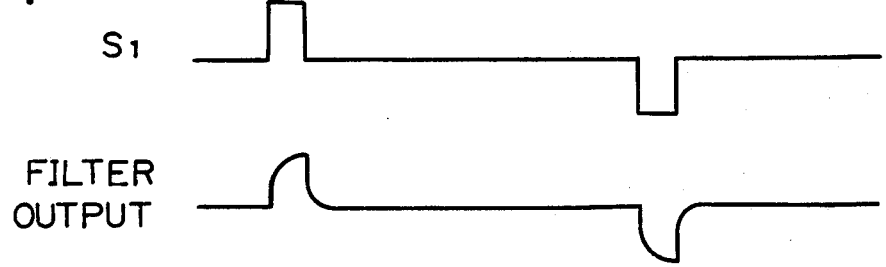

IMAGE ENHANCER WHICH UTILIZES A LOWPASS FILTER AFTER AN OUTLINE EXTRACTING CIRCUIT

BACKGROUND OF THE INVENTION

1. Field of the Invention

The present invention relates to an image enhancer to enhance an outline portion of an image.

2. Description of the Prior Art

For instance, in a video camera, VTR, and television receiver, an image enhancer is provided for a luminance signal system in order to enhance the outline portion of an image.

FIG. 1 is a system diagram of an example of a video camera. Reference numeral 1 denotes an image pickup section comprising a CCD and the like. An image pickup output signal from the image pickup section 1 is supplied to a processing circuit 3 through an amplifier 2. A luminance signal Y and color difference signals R-Y and B-Y of red and blue are derived from the processing circuit 3. The luminance signal Y is supplied to an image enhancer 4 and its outline is enhanced. Thereafter, it is supplied to an encoder 5. The color difference signals R-Y and B-Y are directly supplied to the NTSC encoder 5. A color video signal of, for instance, the NTSC system is obtained from the NTSC encoder 5 and is led to an output terminal 6.

Hitherto, the image enhancer 4 has been constructed as shown in FIG. 2.

Although the outline enhancement is executed in both of the horizontal and vertical directions of an image, since the principles of the enhancement are substantially the same, only the outline enhancement in the vertical direction will be described here.

That is, in FIG. 2, as shown in FIG. 3A, a consideration is made with respect to the case where the luminance signal Y having an outline with respect to the vertical direction is supplied to an input terminal 41.

The luminance signal Y transmitted through the input terminal 41 is supplied to an outline extracting circuit 42 and the outline portion in the vertical direction of the image is extracted. As the outline extracting circuit 42 in the vertical direction, there is frequently used a construction which uses on delay circuit of one horizontal period and obtains a primary differential outline signal as shown in FIG. 3B or a construction which uses two delay circuits of one horizontal period and obtains a secondary differential outline signal as shown in FIG. 3E.

As shown in FIGS. 3B and 3E, in the portions other than the outline, an outline signal $S_1$ obtained from the outline extracting circuit 42 includes micro amplitude noises of the circuit system. The noises increase when the gain is raised. Therefore, the outline signal $S_1$ is supplied to a noise slicing circuit 43 and the micro amplitude noises are eliminated. As shown in FIGS. 3C and 3F, an outline signal $S_2$ from which the micro amplitude noises are substantially eliminated is obtained.

The outline signal $S_2$ from the noise slicing circuit 43 is supplied to an adding circuit 45 through a band limiting low-pass filter 44 for suppressing bands other than an objective frequency band whose outline is to be enhanced.

The filter 44 is provided to suppress the generation of a cross color and to suppress the appearance of the horizontal component in the outline in an oblique fringe. Its cut-off frequency is selected to 2 to 3 MHz.

The adding circuit 45 adds the luminance signal Y which is obtained from the input terminal 41 through a timing adjusting delay circuit 46 and the outline signal $S_2$ from the filter 44. A signal YA which was outline enhanced as shown in FIGS. 3D and 3G is derived and led to an output terminal 47.

A delay amount DL of the delay circuit 46 is set in consideration of the delay in the outline extracting circuit 42. For instance, in the case of extracting the outline by using one delay circuit of one horizontal period, the delay amount DL is set to zero. In the case or extracting the outline by using two delay circuits of one horizontal period, the delay amount DL is set to a value of one horizontal period.

In many cases, the outline extracting circuit 42 and noise slicing circuit 43 at the front stage of the filter 44 are constructed as a single IC. This is because the filter 44 is difficult to construct as an IC and it is arranged after the noise slicing circuit 43, so that the input and output terminals of the IC can be reduced.

However, in the case of the conventional image enhancer with the construction as mentioned above, since the filter 44 is arranged as the last stage of the outline signal forming system, the outline signal $S_2$ which is added to the luminance signal Y becomes unsharp as shown in FIG. 4 because of the band limitation of the filter 44 and the waveform characteristic deteriorates.

On the other hand the noise slicing circuit 43 cannot eliminate all of the noises and cannot eliminate the noises exceeding the slicing range. Among the noises which cannot be eliminated by the noise slicing circuit 43, are the noises whose frequencies ar sufficiently higher than the cut-off frequency of the filter 44. However, there is a drawback that the noises near the cut-off frequency and the noises of the frequencies lower than it remain.

OBJECTS AND SUMMARY OF THE INVENTION

It is, therefore, an object of the present invention to provide an image enhancer which can improve the foregoing drawbacks.

In accordance with an aspect of the present invention, in image enhancer, a band limiting filter is arranged at the front stage of a noise slicing circuit.

Even when the waveform characteristic of an outline signal deteriorates due to the band limiting filter, the waveform is improved by the amount which is sliced by the noise slicing circuit at the post stage of the filter.

On the other hand, since the bands other than the objective frequency band have previously been suppressed by the filter, the noises are more effectively sliced and eliminated by the noise slicing circuit.

The above, and other, objects, features and advantages of the present invention will become readily apparent from the following detailed description thereof which is to be read in connection with the accompanying drawings.

BRIEF DESCRIPTION OF THE DRAWINGS

FIGS. 3 and 4 are diagrams for explaining the circuit of FIG. 2;

DETAILED DESCRIPTION OF THE PREFERRED EMBODIMENTS

Figure 1:
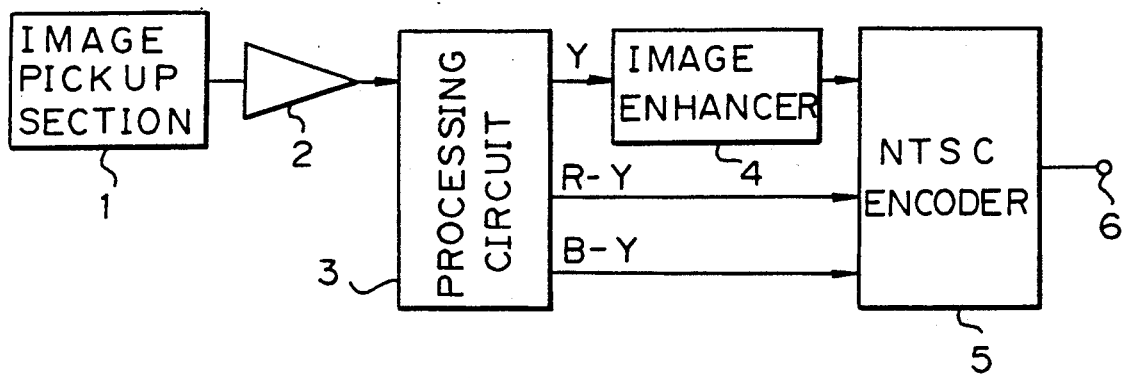
FIG. 1 is an arrangement diagram of an example of a video camera.
Figure 2:
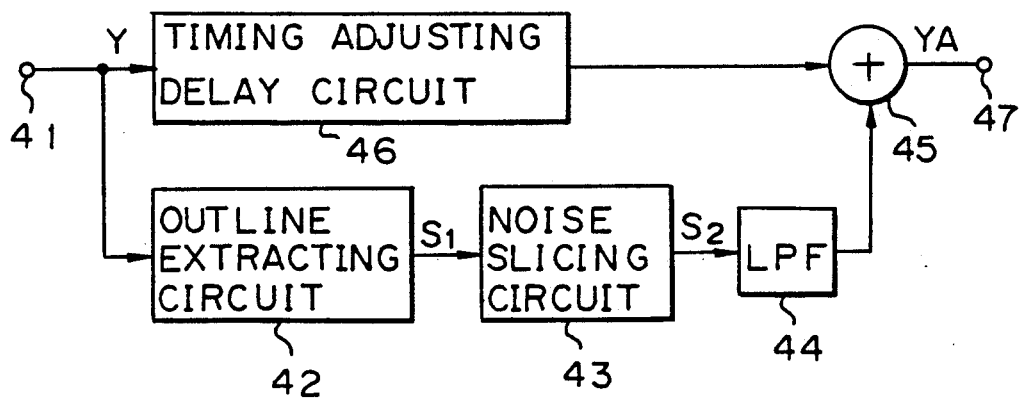
FIG. 2 is a block diagram of an example of a conventional outline enhancing circuit.
Figure 5:
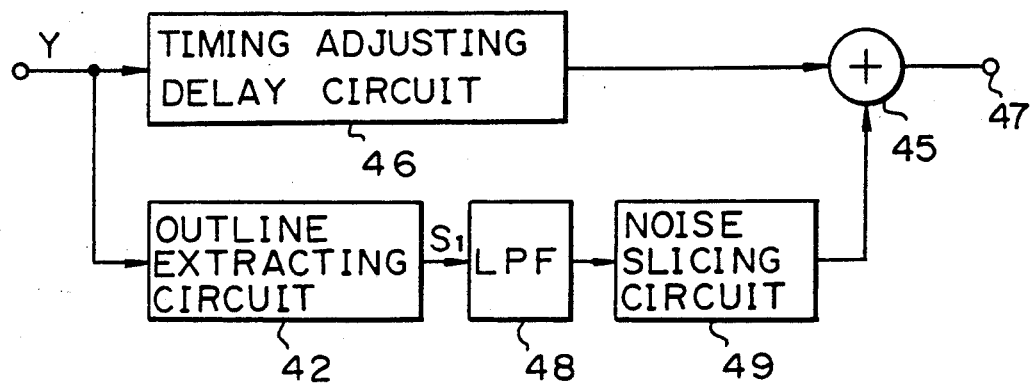
FIG. 5 is a block diagram of an embodiment of the present invention.

FIG. 5 is a block diagram of an embodiment of an image enhancer according to the present invention. The same portions as those in the example of FIG. 2 are designated by the same reference numerals.

In the embodiment, the outline signal $S_1$ from the outline extracting circuit 42 is supplied to a low-pass filter 48 and bands other than an objective frequency band to be outline enhanced are suppressed. Thereafter, the signal is supplied to a noise slicing circuit 49. An output of the noise slicing circuit 49 is supplied to the adding circuit and added to the luminance signal Y from the timing adjusting delay circuit 46.

Figure 6A:
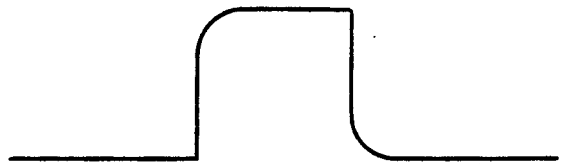
FIGS. 6 to 8 are waveform diagrams for explaining the operation and effects.
Figure 6B:
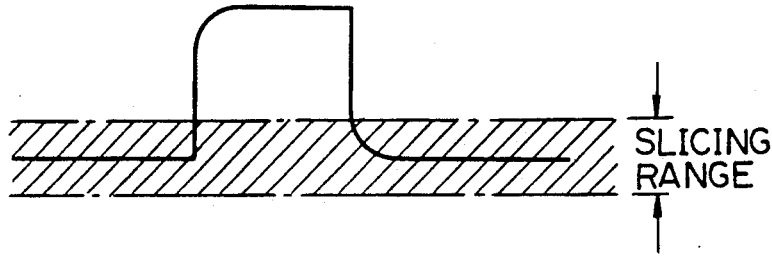
Figure 6C:

Since the invention is constructed as mentioned above, the outline signal $S_1$ from the outline extracting circuit 42 becomes an unsharp waveform as shown in FIG. 6A by the filter 48 and the waveform characteristic deteriorates. However, in the noise slicing circuit 49 at the post stage of the filter 48, the portion in a slicing range shown by hatched lines in FIG. 6B is eliminated in the noise slicing circuit 49. Therefore, after slicing, the waveform from which the dull portion is eliminated is obtained as shown in FIG. 6C and the waveform characteristic is improved.

On the other hand, since the noise components other than the objective frequency band have previously been suppressed by the filter, the noises are effectively eliminated by the noise slicing circuit.

That is, in the case of the construction of the conventional example of FIG. 2, when the noises exceeding the slicing range exist in the outline signal $S_1$, even if they can be attenuated by the filter, they cannot be reduced to zero. However, according to the invention, even if the noises exceeding the slicing range exist in the outline signal $S_1$, they can be reduced to zero. This will be explained with reference to FIGS. 7 and 8.

It is now assumed that the noise level is set to 100 mV, the attenuation by the filter is set to −6 dB, and the slice amount is set to 50 mV.

Figure 7A:
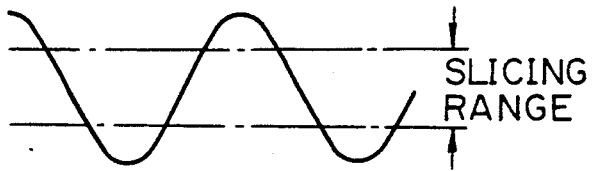
Figure 7B:
Figure 7C:

In the case of the conventional example of FIG. 2, since the noise level exceeds the slicing range as shown in FIG. 7A, the noise components remain in the output of the noise slicing circuit as shown in FIG. 7B. When this output is supplied to the low-pass filter, although the noise components are attenuated into 1/2 as shown in FIG. 7C, they do not become zero.

Figure 8A:
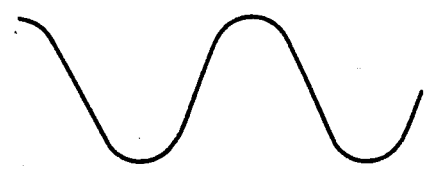
Figure 8B:
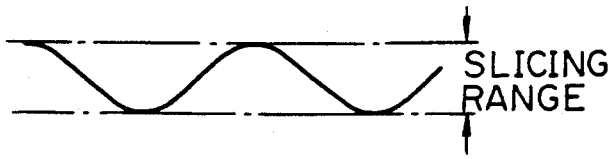
Figure 8C:

On the other hand, in the case of the invention, the noise components shown in FIG. 8A are attenuated into 1/2 as shown in FIG. 8B by the low-pass filter 48. Thus, as will be obvious from FIG. 8B, all of the noises are included in the slicing range. Therefore, the noise components in the output of the noise slicing circuit 49 become zero as shown in FIG. 8C.

In the invention, since the outline signal from the outline extracting circuit is supplied to the noise slicing circuit through the band limiting filter, even if the waveform characteristic of the outline signal deteriorates by the filter, the waveform deteriorated portion of the slicing range portion is eliminated, so that the waveform characteristic is improved.

On the other hand, since the noise components are previously attenuated by the filter, even if the noise components exceeding the slicing range exist in the outline signal, they can be effectively eliminated.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention.

What is claimed is:

1. An image enhancer comprising:
   an input video signal;
   an outline extracting circuit receiving said input video signal and extracting an outline portion from said video signal;
   a low pass filter receiving the output of said outline extracting circuit and suppressing frequencies other than an objective frequency band which is to be enhanced;
   a noise slicing circuit receiving the output of said low pass filter and eliminating micro amplitude noises; and
   an adding circuit which receives an output of said noise slicing circuit and said video signal and adds them to produce a corrected output signal.

* * * * *